Jan. 24, 1961 J. D. FOULKES 2,969,535
ANALOG-DIGITAL INTERCONVERSION CIRCUITRY
Filed Aug. 29, 1957 3 Sheets-Sheet 1

INVENTOR
J. D. FOULKES
BY Alan C. Rose
ATTORNEY

INVENTOR
J. D. FOULKES
BY Alan C. Rose
ATTORNEY

INVENTOR
J. D. FOULKES
BY Alan C. Rose
ATTORNEY

United States Patent Office 2,969,535

Patented Jan. 24, 1961

2,969,535

ANALOG-DIGITAL INTERCONVERSION CIRCUITRY

John D. Foulkes, Bernardsville, N.J., assignor to Bell Telephone Laboratories, Incorporated, New York, N.Y., a corporation of New York Filed Aug. 29, 1957, Ser. No. 681,121

11 Claims. (Cl. 340—347)

This invention relates to circuitry for translating input signals of different magnitudes into binary coded digital output signals, or for recovering the original signals.

In the present encoder, as in the encoding circuits of the prior art, pulses of varying magnitudes are inserted in a delay loop. As each pulse is transmitted through the delay loop, successive digits of a binary code are developed which are representative of the magnitude of the input pulse. In the encoding circuits of the prior art, however, relatively complex branching circuitry is included in the delay loop. In addition, the delay loop circuitry through which the pulses are circulated in the prior art systems includes at least one "decision" or quantization circuit, which selects one of the alternative branch circuits. The terms "decision" circuit and "quantization" circuit are used to designate a circuit in which an output signal depends on the level of the input signal. It is further noted that such circuits are characteristically slow in operation, and their inclusion in the main delay loop of an encoder necessarily reduces its speed of operation.

Accordingly, a principal object of the present invention is to eliminate branching circuits in the delay loop of encoding circuits.

A further object of the present invention is to simplify and increase the speed of operation of analog-digital interconversion circuitry.

In accordance with the present invention, it has been determined that it is not necessary to include either branching circuits or quantization circuits in the main delay loop through which input pulses are circulated. The simplified encoder circuit which is employed utilizes a delay loop including a subtraction circuit, a rectifying circuit for obtaining the absolute magnitude of the circulated signal, and an amplifying circuit connected in series. One digit of the output binary code group is generated each time the pulse is circulated through the delay loop, and the value of the binary output signal during each digit period depends on the sign of the circulated signal at the output of the subtractor. The use of rectifying and doubling circuits in combination with a subtractor is effective to eliminate the need for branching circuits. In addition, this combination of circuits amplifies the less significant portion of the input signal and eliminates the more significant portion or portions of the signal which have been represented by output pulse signals.

It is a feature of the invention that an encoder for pulses of varying amplitude includes a subtraction circuit, a polarity-sensitive output circuit, a full wave rectification circuit, and an amplifier having an amplification factor approximately equal to two.

It is a broad feature of the invention that an encoder includes a subtractor, a polarity-responsive pulse output circuit and a full wave rectifier connected in series in a delay loop.

In accordance with an additional feature of the invention, the subtractor in the circuit described in the preceding paragraph has as a first input the signal which is modified and circulated through the delay loop and the second input is an increment to be subtracted from the circulated signal, and circuitry is provided for doubling the ratio of the modified signal to the increment each time the signal is applied to the subtractor.

It is a further feature of the invention that both the encoder and decoder of an analog-digital interconversion system include a delay loop having an amplifier and a circuit for combining recirculated signals and reference signals connected in series, switching circuitry for selectively recirculating signals around the delay loop or interconnecting the delay loop with an amplitude modulation circuit, and also include circuitry for doubling the ratio of the recirculated signal to the reference signals applied to the combining circuit each time the recirculated signal traverses the delay loop.

One advantage of the present encoder circuits resides in the cyclic permutation code which is produced. Such codes, in which only one binary digit of the output code group is changed in the transition from one input level to the next, are useful in avoiding large errors when the input signal is near the transition from one level to the next.

A complete understanding of this invention and of other objects, features, and advantages thereof may be gained from a consideration of the following description and the accompanying drawing, in which.

Figures 1, 2:
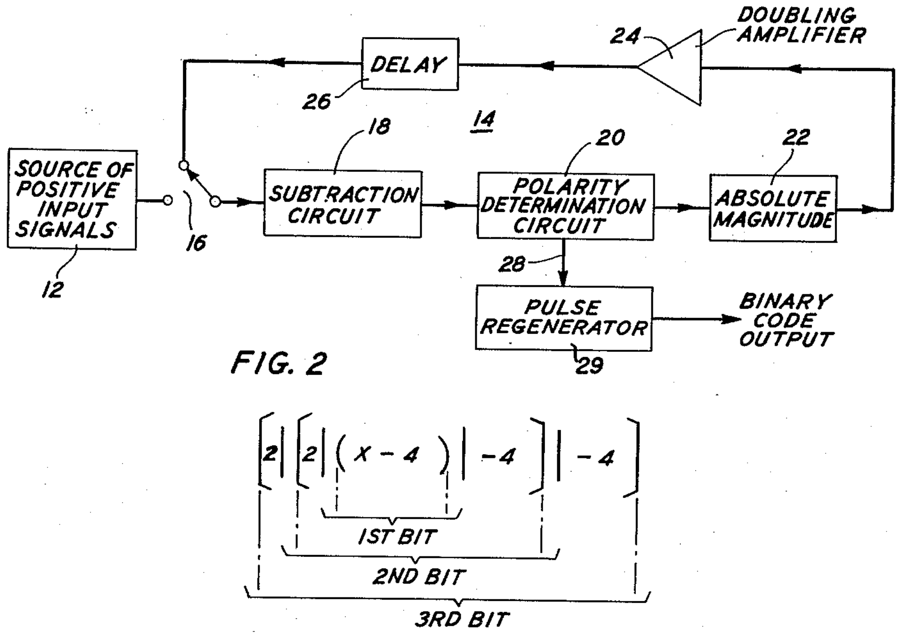
Fig. 1 is a block diagram of an encoder in accordance with the present invention.
Fig. 2 is a diagram indicating the operation of the circuit of Fig. 1 during successive output cycles.

In the illustrative encoder circuit of Fig. 1, input signals are supplied by the source 12. A closed delay loop 14 is coupled to the source of input signals by a switching circuit 16. The delay loop 14 includes the subtraction circuit 18, the polarity determination circuit 20 and "absolute magnitude" circuit 22, and a doubling amplifier 24. A delay circuit 26 may also be included in the closed loop 14 to pad out the delay to the desired value.

The switch 16 is periodically switched to receive signals from the signal source 12. It is thereafter returned to close the loop 14 so that pulse signals may be circulated through the loop several times. Each time a pulse signal passes through the polarity determination circuit 20 in the delay loop 14, a binary output signal having a value of "1" or "0" appears at the output lead 28 from the circuit 20. In actual practice, the sampling circuits and the delay of the loop 14 are carefully synchronized so that the presence or the absence of a signal at the output lead 28 indicates a binary output signal of "1" or "0," respectively. A pulse regenerator 29 is coupled to lead 28 to insure a standard pulse output signal level. In the present illustrative circuit, an output pulse is produced when the pulse applied to the polarity determination circuit 20 is positive and no pulse appears on lead 28 if the signal applied to circuit 20 is negative.

The signals from the source 12 are positive signals, and will be assumed to have values between "0" and an arbitrary voltage level which will be designated "+8 units of voltage." It is to be understood that various input voltage levels may be employed, and that greater or lesser numbers of input levels may be used.

The output from the source 12 may be pulse amplitude modulated signals having various discrete levels, or may be a continuously variable positive signal. In the case of pulse amplitude modulated signals, the discrete levels which appear at the output of the signal source 12 may have the values indicated in the following table. The ranges of the continuously variable signal which will produce the various output code groups are also indicated in Table I.

*Table I*

| Discrete Input Level | Input Range | Binary Output Code Group |
|---|---|---|
| ½ | 0-1 | 011 |
| 1½ | 1-2 | 010 |
| 2½ | 2-3 | 000 |
| 3½ | 3-4 | 001 |
| 4½ | 4-5 | 101 |
| 5½ | 5-6 | 100 |
| 6½ | 6-7 | 110 |
| 7½ | 7-8 | 111 |

The process performed by the circuit of Fig. 1 is indicated diagrammatically in Fig. 2. For the purposes of Fig. 2, it is assumed that the subtractor 18 subtracts a quantity equal to four units of voltage from the input signal. If the resulting pulse signal applied to the polarity determination circuit 20 is positive, a pulse is applied to output lead 28, representing the binary symbol "1." If the signal is negative, no output signal is produced, indicating the binary symbol "0." This polarity determination is made on the quantity included in the brackets designated "1st bit" in the diagram of Fig. 2. As indicated in the circuit of Fig. 1, a pulse circulating through the loop 14 is transmitted through the absolute magnitude circuit 22, the doubling amplifier 24, and the subtraction circuit 18 before its polarity is again determined in the course of producing the next binary output signal. In Fig. 2, the input signal is designated by the letter *x*. The rectification, amplification, and subtraction steps are indicated in Fig. 2 by the absolute magnitude signs, the multiplying factor 2, and the indicated subtraction of the number 4, respectively. The second and third bits are thus determined as indicated in Fig. 2 by these successive operations on the output signal from the polarity determination circuit 20.

As a concrete example of the determination of an output signal from an input signal of a given magnitude, one of the input levels set forth in Table I will now be checked. By way of example, the input level 5½ is selected. Following the process indicated in the diagram of Fig. 2, the following equation results.

$$5\tfrac{1}{2}-4=+1\tfrac{1}{2} \qquad (1)$$

In view of the positive sign of the difference, a pulse is transmitted to the output lead 28 in the circuit of Fig. 1. This is indicated in Table I by the binary symbol "1" in the first digit position of the code group corresponding to the level designated 5½. The process for determining the second bit of the code group involves multiplying the difference indicated in Equation 1 by 2, and subtracting four units from this result. This process is indicated in Equation 2.

$$2(1\tfrac{1}{2})-4=-1 \qquad (2)$$

In view of the fact that the difference indicated by Equation 2 is negative, no pulse appears on output lead 28, thus indicating the binary symbol "0." To determine the third bit of the code group representing the level 5½, it is necessary to take the absolute magnitude of the difference indicated by Equation 2, multiply this quantity by 2, and then subtract 4 from the result. This process is indicated by the following equation.

$$2|-1|-4=-2 \qquad (3)$$

In view of the negative sign of the difference indicated by Equation 3, no pulse is generated by the circuit 20 for application to the output lead 28. The absence of an output signal corresponds to the binary symbol "0" in the third bit position of the code group. The resulting code group 100 thus corresponds with that indicated in Table I for a voltage level of 5½ units.

Figure 3:
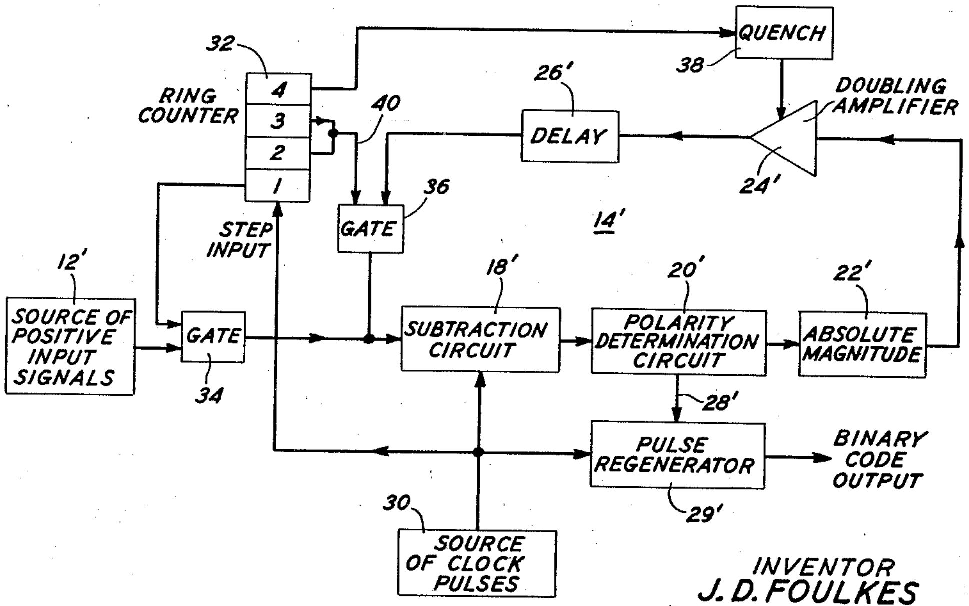
Fig. 3 is a more detailed block diagram of the circuit of Fig. 1.

Fig. 3 is a more detailed block diagram of the circuit of Fig. 1. In Fig. 3, the components corresponding to those of Fig. 1 are designated by primed reference numerals corresponding to those employed in Fig. 1. Thus for example, the source 12′ in Fig. 3 corresponds to the source 12 in Fig. 1. Similarly, the subtraction circuit 18′, the polarity determination circuit 20′, the absolute magnitude circuit 22′, the amplifier 24′, the delay circuit 26′, and the pulse regenerator 29′ find corresponding circuit components in the block diagram of Fig. 1.

In Fig. 3, however, the control circuitry is shown in somewhat greater detail. Specifically, Fig. 3 includes a source of clock pulses 30, a counter circuit 32, two gate circuits 34 and 36, and a quench circuit 38 for the doubling amplifier 24′. The cycle of operation of the circuit of Fig. 3 is determined by the counter 32. Following the last step of the preceding cycle which corresponds to the energization of the fifth stage of the counter 32, it is reset to its initial state by the next clock pulse from the source 30. The gate circuit 34 is opened by a signal from the first stage of the counter circuit 32. During the period when gate 34 is open, the signal from the source 12′ is sampled, and the resulting pulse is applied to the subtraction circuit 18′ in the delay loop 14′. The amount of delay in the loop 14′ is substantially equal to the time period between pulses from the source of clock pulses 30. Accordingly, by the time the signal which was originally transmitted through gate circuit 34 reaches the output of the delay circuit 26′ (in modified form), the second stage of the counter 32 is energized. Gate 36 is enabled by an output from the second stage, and the pulse is recirculated through the delay loop 14′.

The control input 40 to gate circuit 36 is connected to several stages of the counter circuit 32 to permit the recirculation of the signal in the delay loop 14′ for several cycles. The precise number of cycles employed in any given case will be determined by the number of binary signals to be included in the output code group. For the instrumentation of the example given in Table I and Fig. 2, in which only three bits are included in each code group, the gate 36 is connected to stages 2 and 3 of the counter circuit 32 to permit the passage of signals through the output circuit 20′ three times. To insure the elimination of spurious signals from the delay loop 14′, a quench circuit 38 is provided to disable the doubling amplifier 24′. The quench circuit 38 is energized from the last stage of the counter circuit 32 prior to recycling and following the completion of the output code group. If additional digits are to be included in the code groups, additional counter stages connected to lead 40 are inserted between the stages designated 3 and 4 of counter 32. The signals circulating in the delay loop 14′ are timed by the application of clock pulses to the subtraction circuit 18′. This will be explained in somewhat greater detail in connection with the circuit of Fig. 4.

Figure 4:
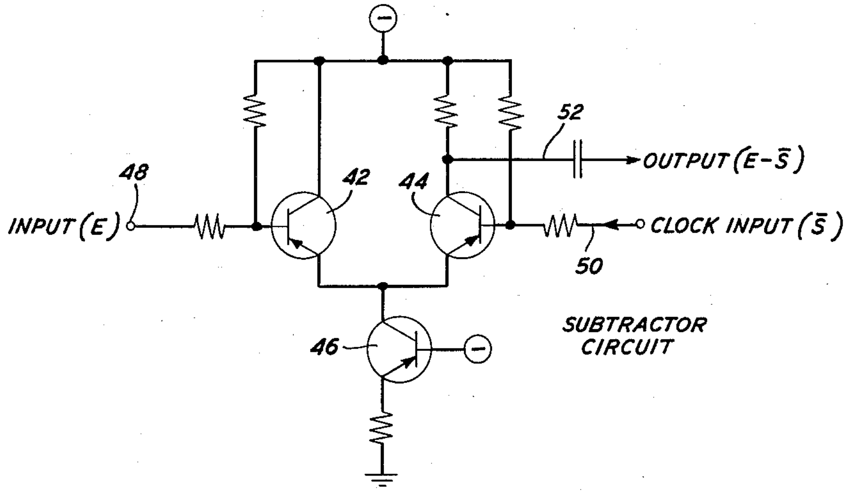
Fig. 4 is a circuit diagram of the subtractor shown in the block diagrams of Figs. 1 and 3.

Fig. 4 is a detailed circuit diagram of one illustrative instrumentation of the subtraction circuit 18′ of Fig. 3. The circuit of Fig. 4 includes three transistors 42, 44, and 46. Fig. 4 is essentially a current dividing circuit in which a portion of the collector current for transistor 46 flows through transistor 42, and another portion of the collector current flows through transistor 44. Positive input signals from one or the other of the gate circuits 34 or 36 of Fig. 3 are applied to input terminal 48 of the subtraction circuit. Positive clock input pulses are applied to the input circuit 50 of Fig. 4. The magnitude of the pulse which appears at output lead 52 depends on the current flow through transistors 42 and 44. All three of the transistors 42, 44, and 46 are normally in the energized condition. If no signal is present at input terminal 48 at the time of the occurrence of a positive clock pulse on lead 50, the transistor 44 is substantially de-energized, and most of the current flows through transistor 42. Under these circumstances, the lead 52 is raised to a potential close to that of the supply, and a large negative pulse is developed. If a relatively large pulse appears on terminal 48, however, concurently with the arrival of a smaller clock pulse on lead 50, more current is carried by transistor 44 than by transistor 42, and lead 52 shifts to a more positive value for the duration of the clock pulse. The resulting positive pulse on lead 52 is applied to the polarity selective output circuit 20' of Fig. 3. The circuit of Fig. 4 therefore constitutes a subtraction circuit in which the clock pulse signals are subtracted from the input pulse signals from the gate circuits 34 or 36 of Fig. 3.

Figure 5:
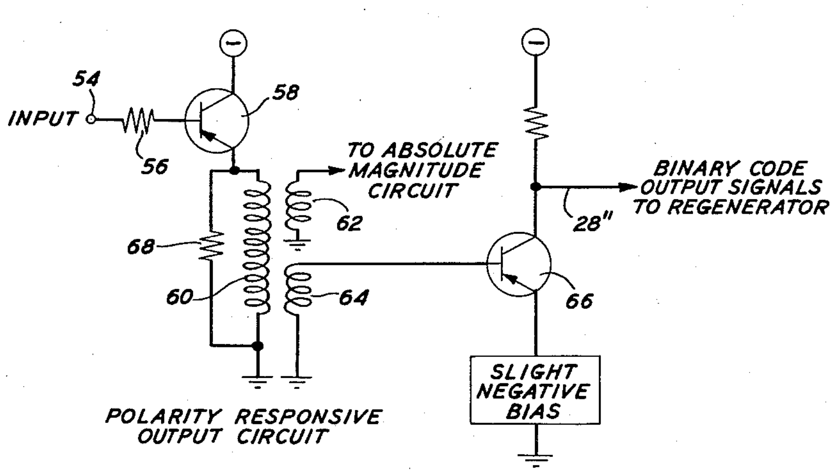
Fig. 5 represents the polarity determination circuit shown as a block in Figs. 1 and 3.

The circuit of Fig. 5 is an illustrative circuit realization of the polarity-responsive output circuit 20' of Fig. 3. The input lead 54 from the subtractor 18' is coupled through resistor 56 to the base of transistor 58. The emitter circuit of the transistor 58 includes a transformer having a primary winding 60 and two secondary windings 62 and 64. Pulse signals are transmitted through the circuit of Fig. 5 to the absolute magnitude circuit 22' through the secondary winding 62 of the transformer. Binary coded output signals are coupled to output lead 28'' through the circuitry including secondary winding 64 and the transistor 66. The transistor 66 is biased to the de-energized state so that it is only responsive to positive pulses which appears across the secondary 64 of the transformer. A damping resistor 68 is provided to avoid over-shoot when negative pulses are applied to the primary winding 60 of the transformer. Accordingly, output pulses appear on lead 28'' when positive input pulses are applied to lead 54, but not when negative input pulses are applied to this lead. Either positive or negative pulses are, however, transmitted through the secondary winding 62 to the next circuit 22' in the encoding delay loop.

Figure 6:
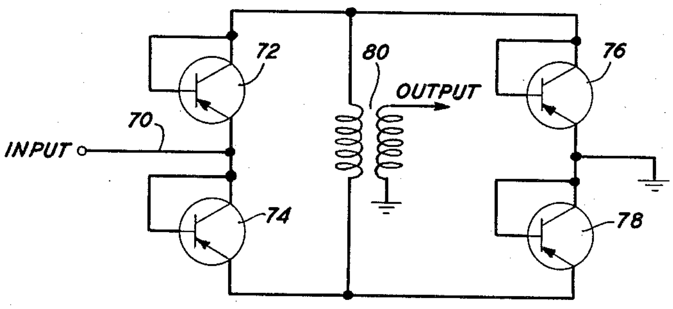
Fig. 6 is a circuit diagram of the "absolute magnitude" or full wave rectifier circuit which also appears as a block in both Figs. 1 and 3.

Fig. 6 represents an illustrative circuit realization of the absolute magnitude circuit 22' of Fig. 3. In the circuit of Fig. 6, input signals are applied between lead 70 and ground. The circuit is essentially a full wave rectifier circuit of the diode bridge type. In order to obtain a sharper knee for the diode characteristic, transistors having their base and collector electrodes directly connected are employed as diodes. The four transistors which are employed in the diode bridge circuit are transistors 72, 74, 76, and 78. An output transformer 80 is provided to couple the output signals of a single polarity to the doubling amplifier 24' which constitutes the next successive circuit in the delay loop 14' of Fig. 3.

In the foregoing discussion, a few of the less obvious circuits which are included in the circuits of Figs. 1 and 3 have been described. The remaining circuits including the doubling amplifier, the quench circuit, the counter, and the pulse regenerator of Fig. 3, for example, may readily be instrumented in accordance with a technology which is compatible with that shown in the circuits of Figs. 4, 5, and 6. For example, the clocked pulse regenerator 29' of Fig. 3 may be a blocking oscillator in which the clock pulses reduce the required triggering level. Appropriate vacuum tube circuits may also be employed to instrument the circuits of Figs. 1 and 3.

Figure 7:
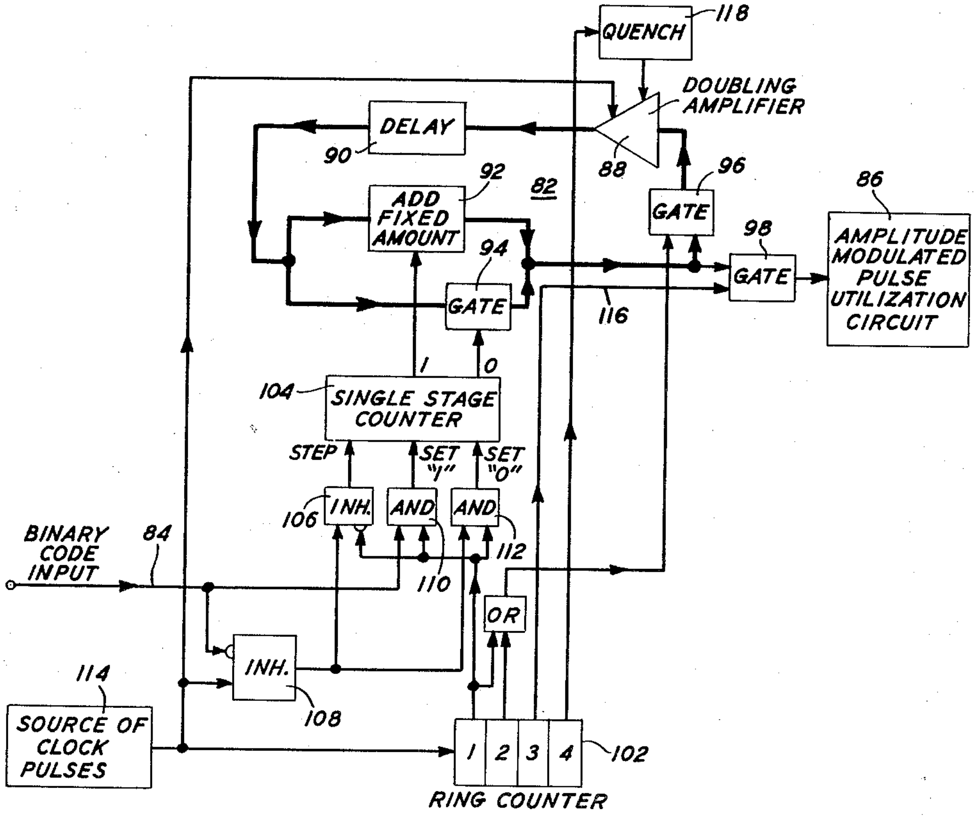
Fig. 7 is a detailed block diagram of a decoder in accordance with the invention which may be employed with the encoder of Figs. 1 through 6.

Fig. 7 is a block diagram of a decoder which may be employed in combination with the encoder of Figs. 1 and 3. In the circuit of Fig. 7, the decoding delay loop 82 is shown in heavy lines. In the delay loop, successive input signals applied to lead 84 are combined to form a pulse of suitable amplitude to be gated through to the output circuit 86. The delay loop 82 includes the doubling amplifier 88, the delay circuit 90, the adder circuit 92, and the three gate circuits 94, 96, and 98.

The logic circuitry including the multistage counter 102 and the single stage counter 104 is designed to insert increments into the delay loop 82 in accordance with the binary coded input signals applied on lead 84. The logic circuits for energizing the single stage counter 104 include the two inhibit units 106 and 108 and the two AND gates 110 and 112. The output from the inhibit unit 106 is connected to the stepping input of the single stage counter 104, and the outputs from the AND units 110 and 112 are connected to the "set 1" and "set 0" inputs, respectively, or the counter 104.

The cycle of operation of the decoder circuit of Fig. 7 is controlled by the source of clock pulses 114 and the multistage counter circuit 102. Assuming that the delay loop is clear, the arrival of a code group is synchronized with the application of a series of clock pulses to the counter circuit 102. The delay of the loop 82 is again approximately equal to the time between successive pulses from the source of clock pulses 114. To permit the circulation of pulses through the delay loop 82 twice, the enabling input to gate 96 is connected to the first two stages of the multistage counter circuit 102. Following the synthesis of a pulse of proper amplitude by the logic circuits coupled to the counter 104 and by the proper operation of circuits 94 and 92, the gate 98 is enabled. The enabling input 116 of the gate 98 is connected to the third stage of the multistage counter circuit 102. Accordingly, the output pulses which are applied to output circuit 86 are an approximate reproduction of the original input signals from the source 12 of Fig. 1, or source 12' of Fig. 3.

In the counter circuits shown in Figs. 3 and 7, the number of stages necessarily depends on the number of bits included in the transmitted code group and the guard space which is maintained between successive code groups. In the case of the counter 102 of Fig. 7, it is necessary that the enabling lead 116 for the gate 98 be energized during the cycle in which the last digit of the code group is received. Otherwise, the signal in the loop 82 would be doubled in magnitude as it circulates around the loop. If longer code groups are employed, additional counter stages having the same connections as stage 2 of the counter would be inserted between stages 2 and 3 of counter 102. The final, or fourth, stage of the ring counter 102 is coupled to the quench circuit 118. The quench circuit 118 disables the amplifier 88 and prepares the delay loop 82 for the reception of signals derived from the next incoming code group.

The rules for the operation of the decoder circuit of Fig. 7 in response to applied code group digits are as follows:

(I) From the initial state:
- (A) Set counter to "Add" or "1" state if input is a binary "1."
- (B) Set counter to "Gate" or "0" state if input is a binary "0."

(II) Following the initial state:
- (A) Change counter state if input is a binary "0."
- (B) Do not change counter state if input is a binary "1."

The foregoing rules are implemented in the circuit of Fig. 7 by the single stage counter circuit 104, the two inhibit units 106 and 108, and the two AND units 110 and 112. The counter has an add or "1" output and a gate or "0" output. As input circuits, the counter has the "step" input from inhibit unit 106, the "set 1" input from the AND unit 110, and the "set 0" input from AND unit 112. The function of the inhibit unit 108 is to provide pulses representing binary "0" input signals. When the counter circuit 102 is in its first state, the inhibit circuit 106 is blocked and the AND units 110 and 112 are enabled. This permits the initial setting of the counter 104 to its proper state in accordance with Rule I set forth above. During the second and third states of the ring counter 102, the counter is stepped from one state to another in response to "0" signals at the output of inhibit unit 108, thus implementing Rule II.

The validity of these rules may be readily checked by reference to the code groups of Table I. It will be found that the signals to the output circuit 86 resulting from the process described above will be one-half unit less than the voltage states indicated in the first column of Table I. However, this discrepancy may be readily corrected by the introduction of an appropriate biasing level.

In the encoder in Fig. 1, it may be recalled that the amplifier 24 doubles signals from the absolute magnitude circuit 22 and that the subtractor 18 subtracts a fixed quantity from applied signals. A signal of the same polarity at the subtractor output during successive cycles may also be obtained by utilizing an amplifier which merely compensates for loop losses, and a subtractor which subtracts increments during successive cycles which are progressively reduced by half. Thus, when a pulse is first received from source 12, the subtractor would subtract an increment of four units; when the difference is circulated through the loop to the subtractor again, an increment of two units would be subtracted, and so on. The requirement for proper operation in both cases is that the ratio of the recirculated signal to the subtracted increment be progressively increased by a factor of two during each cycle.

It is again noted that the encoding circuit, in accordance with the present invention, includes no conditional switching operations in the main delay loop through which pulses are recirculated. More specifically, the polarity determination circuit shown in Fig. 5 transmits pulses of either polarity directly around the main delay loop through the secondary 62 of the transformer. The relatively slower operating "decision" circuitry including the transistor 66 and the regenerator 29' is in a branch circuit, and therefore does not retard the speed of circulation of signals in the main delay loop of the encoder. This permits increased speed of operation of the encoder while still allowing a full digit period for the operation of the transistor 66 and the pulse regenerator.

It is to be understood that the above-described arrangements are illustrative of the applications of the principles of the invention. Numerous other arrangements may be devised by those skilled in the art without departing from the spirit and scope of the invention.

What is claimed is:

1. An encoder for forming a binary representation of the level of applied signals comprising a source of input signals of varying levels; means for subtracting a fixed amount from applied pulses; means for selectively producing output pulses in accordance with the sign of applied electrical pulses; a pulse rectifying circuit; a doubling amplifier; a delay loop including said substraction means, said pulse output means, said rectifying circuit, and said doubling amplifier connected in series; switching means for recirculating signals in said delay loop and for periodically inserting new pulses derived from said source of input signals into said delay loop; and means for quenching electrical signals which may be present in said delay loop concurrently with the insertion of new pulses into said delay loop.

2. An encoder for forming a binary representation of the level of applied signals comprising a source of input signals of varying levels; a delay loop including means for subtracting a preassigned quantity from pulses circulating in the delay loop, means for selectively producing binary output signals in accordance with the polarity of the pulses circulating in the delay loop, a pulse rectifying circuit, and a doubling amplifier, all connected in series; and switching means for periodically inhibiting the pulse circulating in said delay loop and for simultaneously inserting a new pulse derived from said source into said delay loop.

3. In combination, a closed loop recirculation circuit including a subtractor, a polarity-responsive pulse output circuit, a full wave rectifier and a doubling amplifier connected in series.

4. An encoder comprising a subtractor, a polarity-responsive output circuit, and a full wave rectifier connected in a series circuit loop, said subtractor having a first input signal applied to it from said full wave rectifier circuit, means for supplying a second input signal to said subtractor for subtraction from said first input signal, and means for doubling the ratio of said first signal with respect to said second signal prior to the subtraction operation each time the signal is circulated around said circuit loop.

5. An encoder comprising a subtractor, a polarity-responsive output circuit, a full wave rectifier, and an amplifier connected in a series circuital loop, said subtractor having a first input signal applied to it from said full wave rectifier circuit through said amplifier, and means for supplying a second input signal to said subtractor for subtraction from said first input signal, said amplifier and said subtractor including means for doubling the ratio of said first signal to said second signal prior to the subtraction operation each time the first signal is circulated around said circuit loop.

6. In combination, a delay loop including a doubling amplifier and a pulse signal combining circuit means connected in series, an amplitude modulation circuit, switching circuit means for selectively interconnecting said delay loop and said amplitude modulation circuit, means for transmitting reflected binary signals, pulse circuits means for selectively producing output signals interconnecting said transmission means and said delay loop, and means for selectively controlling the energization of one of said pulse circuit means in accordance with the output of the other of said pulse circuit means.

7. In combination, a source of amplitude modulated signals, an encoder, switching means for periodically connecting said source to said encoder, a decoder, and a binary code transmission channel interconnecting said encoder and said decoder; both said encoder and said decoder including a pulse signal combining circuit and an amplifier connected in a series circuital loop, said signal combining circuit having a first input applied to it from said amplifier, means for providing a second input signal for combination with said first input signal, said amplifier and said last-mentioned means including circuitry for doubling the ratio of said first signal to said second signal prior to the combining operation each time the first signal is circulated through said loop.

8. A circuit as defined in claim 7 wherein the pulse signal combining circuit of the encoder is a subtractor, and wherein the pulse signal combining circuit of the decoder constitutes means for adding a voltage to the circulating signal or gating the circulating signal around the delay loop in accordance with received binary code signals.

9. An encoder comprising a delay loop including a doubling amplifier and a pulse signal subtraction circuit means connected in series, a source of amplitude modulated input signals switching circuit means for selectively interconnecting said delay loop and said source of input signals, means for transmitting reflected binary signals, pulse circuit means for selectively producing output signals interconnecting said transmission means and said delay loop, and means for controlling the energization of said last-mentioned pulse circuit means in accordance with the output of said pulse subtraction circuit means.

10. A decoder comprising a delay loop including a doubling amplifier and a pulse signal combining circuit connected in series, an amplitude modulation circuit, switching circuit means for selectively interconnecting said delay loop and said amplitude modulation circuit, means for transmitting reflected binary signals, pulse circuit means for selectively producing signals interconnecting said transmission means and said delay loop, and means for controlling the energization of said pulse combining circuit in accordance with the output of said pulse circuit means.

11. In combination, a delay loop including a doubling amplifier and a pulse signal combining circuit means connected in series, said combining circuit having a first input connected in series with said delay loop and a second input, means for doubling the ratio of the signals applied to said first input with respect to those applied to said second input each time pulse signals are circulated through said delay loop, an amplitude modulation circuit, switching circuit means for selectively interconnecting said delay loop and said amplitude modulation circuit, means for transmitting reflected binary signals, pulse circuit means for selectively producing output signals interconnecting said transmission means and said delay loop, and means for selectively controlling the energization of one of said pulse circuit means in accordance with the output of the other of said pulse circuit means.

References Cited in the file of this patent

UNITED STATES PATENTS

| | | |
|---|---|---|
| 2,658,997 | Carbrey et al. | Nov. 10, 1953 |
| 2,775,727 | Kernahan et al. | Dec. 25, 1956 |